United States Patent Office 3,442,986
Patented May 6, 1969

3,442,986
MONO HALOALKYL BIS-HYDROXY OXYALKYLENE PHOSPHATES
Maurice Frederick Mole, Kingswinford, James Keith Jacques, Birmingham, and John Desmond Collins, Albrington, near Wolverhampton, England, assignors to Albright & Wilson (Mfg.) Limited, Oldbury, near Birmingham, Warwickshire, England, a British company
No Drawing. Filed June 7, 1965, Ser. No. 462,060
Claims priority, application Great Britain, June 5, 1964, 23,487/64
Int. Cl. C07f 9/06
U.S. Cl. 260—953         2 Claims

ABSTRACT OF THE DISCLOSURE

Dihydroxy compounds suitable for use in the manufacture of modified polymeric materials having the formula $(RO)PO[OC_2H_3R')_yOH]_2$ where each R is a haloalkyl group having from 2 to 8 carbon atoms of which the $\beta$-carbon atom and each subsequent carbon atom is attached to at least one halogen atom having an atomic number of from 17 to 35, R' is selected from the group which consists of hydrogen, methyl, chloromethyl and bromomethyl, and each y has a value of from 1 to 20. The invention also provides compositions containing a major portion of at least one of said dihydroxy compounds. The dihydroxy compounds are preferably prepared by reacting an acid phosphate of the formula $(RO)PO(OH)_2$, with from 2 to 40 molar portions of an alkylene oxide selected from ethylene oxide, propylene oxide, and epichlorhydrin, at a temperature between about 40° and 85° C.

---

This invention relates to certain compounds for use in the manufacture of modified polymers having improved flame retardance, methods for preparing the said compounds and modified polymeric materials derived from or containing such compounds.

The polymeric materials to which this invention applies are those of the type formed by the reaction of a polyhydroxy compound with a compound having at least two hydroxyl-reactive groups. Examples of such polymers include polyesters, polyurethanes, polyethers, and polyacetals. "Hydroxyl-reactive groups" herein refers to those substituents of a first organic molecule which are capable of reacting with alcoholic —OH groups on a second organic molecule, thereby forming a chemical link between the first and second molecules. Examples are carboxyl groups, isocyanate groups and epoxy groups.

"Improved flame retardance" herein means that the tendency of a modified material to burn is less than that of the unmodified material. This tendency may be measured by the American Standard Test Method appropriate to the physical nature of the material e.g. A.S.T.M. D635–56T for cured resins and A.S.T.M. D1692–59T for foamed material.

When it is desired to modify polymeric materials with a view to improving their flame retardancy, it is advantageous to employ a monomer unit capable of being directly incorporated in the polymeric molecule thus rendering the polymer molecule itself flame retardant. It has been proposed to use in this way certain hydroxy esters of phosphoric acid, for example in the preparation of flame retardant polyesters and polyurethanes. In particular, it has been proposed to use as an ingredient in the preparation of modified polymers of this type the product of the reaction between an alkylene oxide and phosphoric acid in proportions of at least 3 mols alkylene oxide to one mol of phosphoric acid. Typical esters of this type include $(HOCH_2CH_2)_3PO$ prepared from ethylene oxide. Other alkylene oxides which have been used include epichlorohydrin and propylene oxide. Such esters possess 3 hydroxyl groups and may be reacted with dicarboxylic acids such as maleic acid, phthalic acid, or with anhydrides of any of these acids. The product in each case is a polymer commonly referred to as polyester resin. By incorporating in such polymers other trifunctional alcohols such as glycerol and by curing with ethylenically unsaturated compounds such as styrene a wide range of polyester materials may be provided having varying degrees of flame retardance.

Polyurethanes may be prepared by mixing, in a suitable formulation, a polyisocyanate and a polyhydroxy compound. The polyhydroxy compound is preferably a polyester or polyether having a molecular weight of at least 150. Polyhydroxy alcohols having a molecular weight of from 300 to 600, and high hydroxyl number (e.g. about 500) are preferred for the preparation of rigid polyurethanes, while higher molecular weight polyhydroxy compounds, for example 1000 to 6000, with low hydroxy numbers, tend to form flexible products. Incorporation into suitable polyester formulations of foaming agents such as water or a low boiling point liquid such as a halogenated lower hydrocarbon, gives rise to foamed products. In the absence of such agents a non-foamed elastomeric polyurethane may be prepared.

We have discovered certain novel phosphate esters which possess the desirable property that polymers with improved flame retardancy may be obtained when they are incorporated into suitable polymer formulations by condensation or addition reactions.

Our invention consists in compounds suitable for use in the manufacture of modified polymeric materials having the general formula $(RO)PO[(OC_2H_3R')_yOH]_2$, where each R is a haloalkyl group having from 2 to 8 carbon atoms and at least 1 halogen atom attached to each carbon atom other than the $\alpha$-carbon atom, each R' is a hydrogen atom or a methyl, chloromethyl or bromomethyl group, and each y has a value from 1 to 20.

The invention also consists in a method of preparing the compounds of the invention which comprises reacting an acid phosphate of the formula $(RO)PO(OH)_2$ where R is defined above, with at least sufficient of an alkylene oxide which is ethylene oxide, propylene oxide, epichlorhydrin and/or epibromhydrin, substantially to complete the esterification of the acid phosphate.

The invention further consists in polymeric materials of the type formed by the copolymerisation of a compound possessing at least two alcoholic hydroxy groups with a compound possessing at least two hydroxyl-reactive groups, which materials having been derived from or modified with the compounds of the invention.

Examples of preferred compounds of the invention include mono($\beta$-bromo,$\gamma$ - chloropropyl)bis($\beta$ - hydroxypropyl)phosphate, mono($\beta$,$\gamma$ - dibromopropyl) bis($\beta$-hydroxyethyl) phosphate, mono($\beta$,$\gamma$-dichloropropyl) bis($\beta$-hydroxy-$\gamma$-chloropropyl)phosphate, mono($\beta$,$\gamma$ - dichloropropyl) bis($\beta$-hydroxyethyl)phosphate, mono($\beta$,$\gamma$-dibromopropyl) bis($\beta$-hydroxypropyl) phosphate, mono($\beta$,$\gamma$-dichloropropyl bis($\beta$-hydroxypropyl) phosphate, each of which has two hydroxyl groups and may be copolymerised with a compound having at least two hydroxyl-reactive groups.

The invention also provides mixture containing a minor portion of monohydroxy compounds such as bis($\beta$,$\gamma$-dibromopropyl) mono($\beta$ - hydroxy-$\gamma$-cholorpropyl) phosphate bis($\beta$,$\gamma$ - dibromopropyl) mono($\beta$ - hydroxyethyl) phosphate, bis($\beta$,$\gamma$-dichloropropyl) mono($\beta$-hydroxy,$\gamma$-chloropropyl) phosphate, bis($\beta$,$\gamma$-dichloropropyl) mono ($\beta$ - hydroxyethyl)phosphate, bis($\beta$,$\gamma$ - dibromopropyl) mono($\beta$-hydroxypropyl) phosphate, and bis ($\beta$,$\gamma$-dichloropropyl) mono(β-hydroxypropyl) phosphate, together with the major portion of dihydroxy compounds. The monohydroxy esters can be used as "chain stoppers" to terminate the polymerisation reaction.

Less preferred esters include those possessing β-chloroethyl or β-bromoethyl groups as the halo-alkyl group or groups e.g. mono(β-bromoethyl) bis(β-hydroxyethyl) phosphate and bis(β-chloroethyl) mono(β-hydroxypropyl) phosphate. Other compounds of the invention may be derived from acid phosphates of alkyl groups having up to eight carbon atoms, and at least one atom of chlorine or bromine attached to each carbon atom apart from the α-atom. Certain such alkyl groups may be conveniently derived from unsaturated alcohols, by direct halogenation. E.g. hexachloroheptanol.

Other compounds of the invention may be formed as a consequence of the reaction of more than sufficient alkylene oxide to complete the esterification of the phosphoric acid, giving rise to polyether esters such as

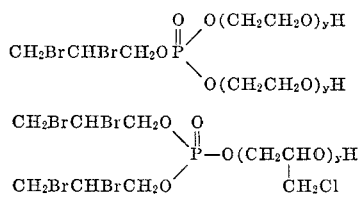

where each $y$ has a value greater than 1. However, condensation reactions of alkylene oxide do not result in a uniform product, but a spectrum of compounds in which the total number of alkyleneoxy units contained therein varies on either side of a number corresponding to the number of molecular proportions of alkylene oxide employed. Thus it is to be understood that references herein to a single compound containing a polyalkyleneoxy chain are to be construed as including a reference to mixtures of such compounds with different values of $y$, the values of $y$ given in the formula denoting an average value corresponding to the number of molecular proportions of alkylene oxide used in preparing the said compounds.

The acid phosphates for use in the method of the invention are conveniently prepared by adding phosphorus pentoxide to a mixture of haloalkanol and water. Preferably one molar proportion of phosphorus pentoxide is added slowly to a mixture of two molar proportions of haloalkanol and two molar proportions of water, while the temperature is maintained below 50° C. by cooling. Any unreacted $P_2O_5$ is filtered off and the filtrate shaken with excess water, whereupon it separates into two layers. The upper aqueous layer contains a major proportion of mono(haloalkyl) phosphate and a minor proportion of bis(haloalkyl) phosphate, and may be separated from the lower layer, which comprises a major proportion of bis-(haloalkyl) phosphate.

Water may be removed from the upper layer by distillation under reduced pressure, and the product used directly in the method of the invention, thereby forming a mixture as major proportion of difunctional, together with some monofunctional material. By varying the proportion of mono- to difunctional material in the compounds of our invention, the degree of polymerisation of the modified polymers may be varied.

Preferred starting materials for use according to process of the invention are, β,γ-dibromopropyl acid phosphate, β-chloro γ-bromopropyl acid phosphate and β,γ-dichloropropyl acid phosphate.

In the method of our invention there is added to the acid phosphate at least sufficient of a suitable alkylene oxide a dihydroxy alcohol to complete the esterification of the phosphoric acid. The temperature of the mixture rises to 60° C. at this stage and should be maintained at this level until vigorous reaction ensues. Thereafter the reaction mixture is cooled to maintain the temperature at 40° to 85° by cooling, and preferably from 60° to 70° C. to avoid charring of the product. The second stage of the reaction may be carried out in the presence of a base or Lewis acid as alkylene oxide condensation catalyst. The resulting product may be purified, for example by steam stripping.

The polymeric material of the invention may be a polyester formed by reacting a dicarboxylic acid or an anhydride thereof (or a mixture of dicarboxylic acids or anhydrides) with a compound according to the invention, preferably having two hydroxyl groups and preferably with additional polyol, which may for example be ethylene glycol, glycerol, trimethylolpropane pentaerythritol or or a polyethylene glycol. Where an unsaturated acid or alcohol was employed in the preparation of the polyester, the unsaturated polyester may subsequently be cured by copolymerisation with a vinylic material such as styrene. The dicarboxylic acids preferred for use in forming the polyesters are maleic acid, chlorendic acid tetrachlorophthalic acid and/or phthalic acid. The uncured polyesters preferably contain from 0.1–10% by weight of phosphorus and from 1% to 20% by weight of halogen. Preferred proportions are one equivalent of additional polyol plus a total of 2 equivalents of acid or anhydride. It is preferred to co-polymerise the polyester material with from 70 to 80% by weight of a vinylic compound which is preferably styrene, in the presence of conventional polymerisation catalysts such as cobalt naphthenate. A polymeric material according to the invention so formed preferably contains additional additives such as U.V. and heat stabilisers, plasticisers etc. Vinylic compounds which may be used in place of, or in addition to, styrene include vinyl chloride and vinyl acetate.

Polyurethanes, modified according to the invention, may be prepared by mixing, in a suitable formulation, an organic polyisocyanate and a compound of the invention having at least two hydroxy groups and a molecular weight of at least 150, and preferably at least 300, or a mixture of dihydroxy compounds comprising a compound of the invention and/or a polyester of the invention as described above, together with other polyhydroxy compounds, e.g. polyesters and polyethers having molecular weights of from 300 to 8,000.

The polyether is preferably a linear polypropylene ether glycol or a condensation product of propylene oxide with a tri-, tetra- or hexa-functional nucleating compounds such as glycerol, trimethylol-propane, hexanetriol, pentaerythritol or a hexitol, the glycol or condensation product preferably havng a molecular weight in the ranges defined above. Other suitable polyethers include mixed condensation products of propylene and ethyleneoxides, either with themselves or with a nucleating compound, and polymers of tetra-hydrofuran. Examples of various polyethers which may be used are set out in some detail in U.K. specification No. 892,136. The polyesters are normally esters of glycols and/or glycerol, trimethylol-propane or pentaerythritol with dicarboxylic acids such as adipic, phthalic or maleic acids, singly or in admixture. The polyesters have at least 2 free hydroxyl groups and preferably have a hydroxyl functionality of from 2 to 4.

In the preparation of polyurethanes of this invention use is made of techniques for producing polyurethane materials in various forms, such as elastomers or foams, which have been described in the literature. Preferably a polyurethane foam is produced by forming a gas from a foaming agent simultaneously with the urethane polymer under such conditions that the polymer is expanded by the gas. The foaming agent for the production of the gas may be a small controlled quantity of water which reacts with isocyanate groups forming carbon dioxide, or a low boiling liquid, for example a fluorinated low molecular weight hydro-carbon, which may be incorporated in the reaction mixture. In the latter case the exothermic nature of the urethane reaction vaporises the liquid and the vapour is utilised to create the necessary expansion. As is well-known the foaming agent tmay be added either initially (with the other ingredients of the reaction mixture), or subsequently (to a prepolymer prepared from the polyhydric alcohol and the polyisocyanate) optionally together with a further amount of the polyhydroxy compound or polyisocyanate. The foams may be made by continuous or discontinuous mixing methods and may, if desired, be subjected to a heat treatment as an after-cure.

The production of the polyurethane materials is preferably carried out in the presence of catalysts and/or surface-acting agents. Of particular value is the use of tertiary amines and/or organo-tin compounds and/or tin carboxylate salts as catalysts and silicone oils and polysiloxane-polyoxylalkylene copolymers as cell-controlling agents.

In general any polymer obtained by the action of an organic compound containing two or more alcoholic hydroxyl groups on a compound possessing two or more hydroxyl-reactive groups may be modified in accordance with our invention by substituting a compound of the invention for a part or all of the former compound.

The proportion of phosphorus in the polymer required to give a reproducable self-extinguishing result is dependent upon the formulation of the polymer and the way in which the phosphorus is incorporated. Generally speaking, polymers are more effectively modified if a compound of the invention is incorporated into the polymer molecule at a site near one end, rather than in the middle of the molecule. Thus, for example, a monofunctional compound of the invention, which acts as an end stopper, is often more effective for modifying polymers than a difunctional compound. However it is possible to incorporate mre of the difunctional material into the polymer, therefore it is normally advantageous to use mixtures difunctional and monofunctional material.

Useful modification is seldom obtained if the polymer contains less than about 0.1% of phosphorus.

The invention will be illustrated by the following examples.

EXAMPLE 1

Preparation of $\beta,\gamma$-dibromopropyl acid phosphate

Phosphorus pentoxide (47.3 g.) was added slowly to $\beta,\gamma$-dibromopropanol (218 g.), the mixture being constantly stirred and the temperature being kept below 40° C. After all the phosphorus pentoxide had been added, the mix was stirred for another 60 minutes whilst the temperature was maintained at 40° C., and then cooled to room temperature. There was left 265 g. of an almost colourless mobile liquid.

Preparation of $\beta,\gamma$-dibromopropyl, $\beta$-hydroxy-$\gamma$-chloropropyl phosphate Epichlorhydrin (185 g.) was slowly added to the $\beta,\gamma$-dibromopropyl acid phosphate (265 g.) to maintain the temperature between 60–70° C. After all the epichlorhydrin had been added the mix was stirred for a further 60 minutes at 60° C. Excess epichlorhydrin was removed by vacuum distillation using a water pump (15 mm. of mercury), the distillation flask being taken to 140° C. There remained 358 g. of an almost colourless viscous liquid having an acid value of 0.4 (mg. KOH per gm. to the phenolphthalein end point).

EXAMPLE 2

Preparation of $\beta,\gamma$-dibromopropyl, $\beta$-hydroxypropyl phosphate

Propylene oxide (174 g.) was added slowly to $\beta,\gamma$-dibromopropyl acid phosphate (265 g.; as prepared in Example 1), whilst the temperature of the exothermic reaction was maintained between 30–40° C. by means of external cooling. On completion of the addition the mix was kpet at 40° C. for 60 minutes. Excess propylene oxide was then removed by distillation at reduced pressure (15 mm. of mercury) leaving 350 g. of an almost colourless viscous liquid having an acid value less than 0.1 (mg. KOH per gm. sample to the phenolphthalein end point).

EXAMPLE 3

Preparation of $\beta,\gamma$-dibromopropyl acid phosphate (high mono content)

Phosphorus pentoxide (72 g.) was slowly added to an emulsified stirred mixture of $\beta,\gamma$-dibromopropanol (218 g.) and water (9 g.) the temperature being kept below 40° C. On completion of the addition the mix was then heated for 60 minutes at 70° C. There was left 299 g. of a viscous liquid.

Preparation of $\beta,\gamma$-dibromopropyl bis($\beta$-hydroxy ethyl) phosphate Ethylene oxide (220 g.) was passed through the above acid phosphate, the temperature of the reaction being maintained at approximately 40° C. by means of external cooling. On completion of the addition the mix was held at 40° C. for a further 60 minutes and then the excess ethylene oxide was removed by vacuum distillation at reduced pressure (15 mm. of mercury). On cooling there was left 440 g. of an almost colourless viscous liquid having an acid value of 4.3 (mg. KOH per g. sample to phenolphthalein end point).

EXAMPLE 4

Preparation of $\beta,\gamma$-dibromopropyl acid phosphate (high mono)

One molar proportion of phosphorus pentoxide was added slowly with stirring to a mixture of two molar proportions of $\beta,\gamma$-dibromopropanol, and two molar proportions of water, the mixture being cooled throughout to maintain the temperature at about 25° C. Excess pentoxide was filtered off and the filtrate was shaken with excess cold distilled water. The liquid separated into two phases. The upper layer was separated and distilled under reduced pressure to remove water. The produce comprises 65% mono($\beta,\gamma$-dibromopropyl) acid phosphate and 25% of bis($\beta,\gamma$-dibromopropyl) acid phosphate.

Preparation of $\beta,\gamma$-dibromopropyl, $\beta$-hydroxypropyl phosphate

The above product was mixed with propylene oxide in a proportion of 5 moles propylene oxide per gram atom of phosphorus under the conditions described in Example 2.

EXAMPLE 5

The procedure of Example 4 was repeated using $\beta$-chloro, $\gamma$-bromopropanol in place of the $\beta,\gamma$-dibromopropanol.

EXAMPLE 6

The procedure of Example 4 was repeated using $\beta,\gamma$-dichloroproanol.

EXAMPLE 7

|  | G. |
|---|---|
| The product of Example 3 | 47 |
| Ethylene glycol | 33 |
| Maleic anhydride | 20 |
| Phthalic anhydride | 59 |

The above formulation was mixed, heated to 150° C. in a nitrogen atmosphere and water was removed by distillation. After 14 hours the residue, a very viscous oil having an acid number of 86, was mixed with the 32 g. styrene and 6 g. of benzoyl peroxide (50% solution in tricresyl phosphate). After 15 hours at 80° C., a hard clear polymer was obtained which was self extinguishing in 1 min. 15 secs. after two ignitions when tested by ASTM D635–56T.

EXAMPLE 8

| | G. |
|---|---|
| The product of Example 1 | 162 |
| Triethylene glycol | 45 |
| Maleic anhydride | 20 |
| Phthalic anhydride | 59 |

The above formulation was mixed and heated for 4½ hours at 160° C. in a nitrogen atmosphere. The viscous oil produced had an acid member of 99 and was mixed with 176 g. of styrene and 14 g. of benzoyl peroxide and heated as described in Example 4. The polymer thus formed was self extinguishing in 11 secs.

EXAMPLE 9

| | G. |
|---|---|
| The product of Example 2 | 47 |
| Ethylene glycol | 14 |
| Maleic anhydride | 10 |
| Chlorendic anhydride | 74 |

The above formulation was mixed and heated for 4½ hours at 160° C. in a nitrogen atmosphere. The viscous oil produced, having an acid number of 85, was mixed with 29 g. styrene and 5 g. benzoyl peroxide and heated for 15 hours at 80° C. The polymer formed was self extinguishing in 10 secs.

EXAMPLE 10

| | Gms. |
|---|---|
| The product of Example 4 | 25 |
| Propylene oxide/glycerol condensate of molecular weight about 3,000 and hydroxyl number 52.7 | 75 |
| Water | 3 |
| Polysiloxane alkyleneoxy copolymer sold by Union Carbide as "LS550" | 1.3 |
| Triethylene diamine | 0.2 |
| Stannous octoate | 6.4 |

The formulation was thoroughly mixed and 51 grams of toluene diisocyanate were rapidly added with vigorous stirring, the reaction was then poured into a mould and allowed to foam. A flexible foam was obtained which was self extinguishing according to ASTM D1692–59T. The foam contained 0.7% of phosphorus.

EXAMPLE 11

The procedure of Example 10 was repeated using 23 gms. of the product of Example 5 in place of the product of Example 4. A flexible foam was obtained which contained 0.75% phosphorus and which was self extinguishing in less than 10 secs.

EXAMPLE 12

The procedure of Example 10 was repeated using 21 gms. of the product of Example 6. A flexible foam containing 0.7% phosphorus was obtained, and found to be self extinguishing by ASTM D1692–59T.

We claim:
1. A compound having the formula

$$(RO)PO[(OC_2H_3R')_yOH]_2$$

where each R is a haloalkyl group having from 2 to 8 carbon atoms of which the β-carbon atom and each subsequent carbon atom is attached to at least one halogen atom having an atomic number of from 17 to 35, R' is selected from the group which consists of hydrogen, methyl, chloromethyl and bromomethyl, and each y has a value of from 1 to 20.

2. A compound according to claim 1 wherein each R is a β,γ-dihalopropyl group in which each halogen atom has an atomic number from 17 to 35.

References Cited

UNITED STATES PATENTS 2,909,559   10/1959   Lanham  260—953

CHARLES B. PARKER, *Primary Examiner.*

ANTON H. SUTTO, *Assistant Examiner.*

U.S. Cl. X.R.

260—2, 75, 77.5, 978, 980, 990